J. T. LISTER.
INNER TUBULAR SUPPORT FOR PNEUMATIC TIRES.
APPLICATION FILED JULY 26, 1918.
1,291,948.
Patented Jan. 21, 1919.
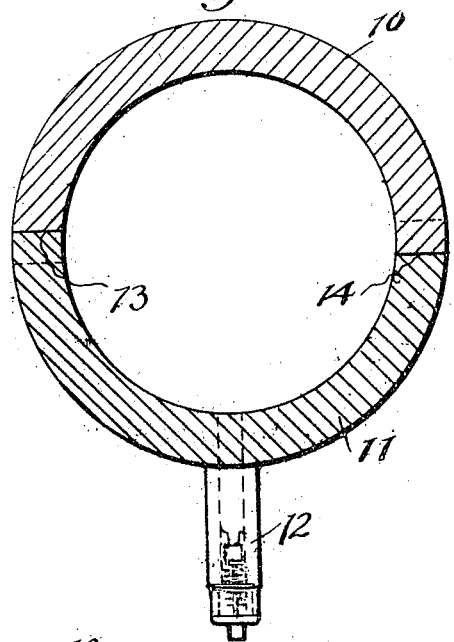
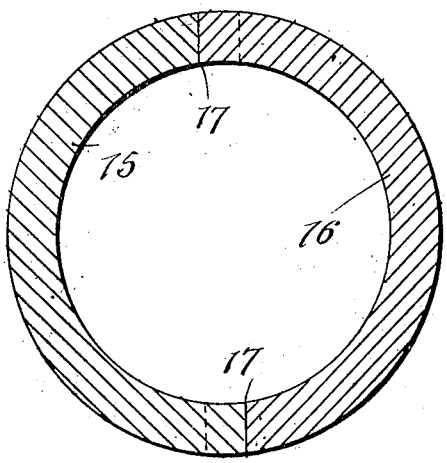
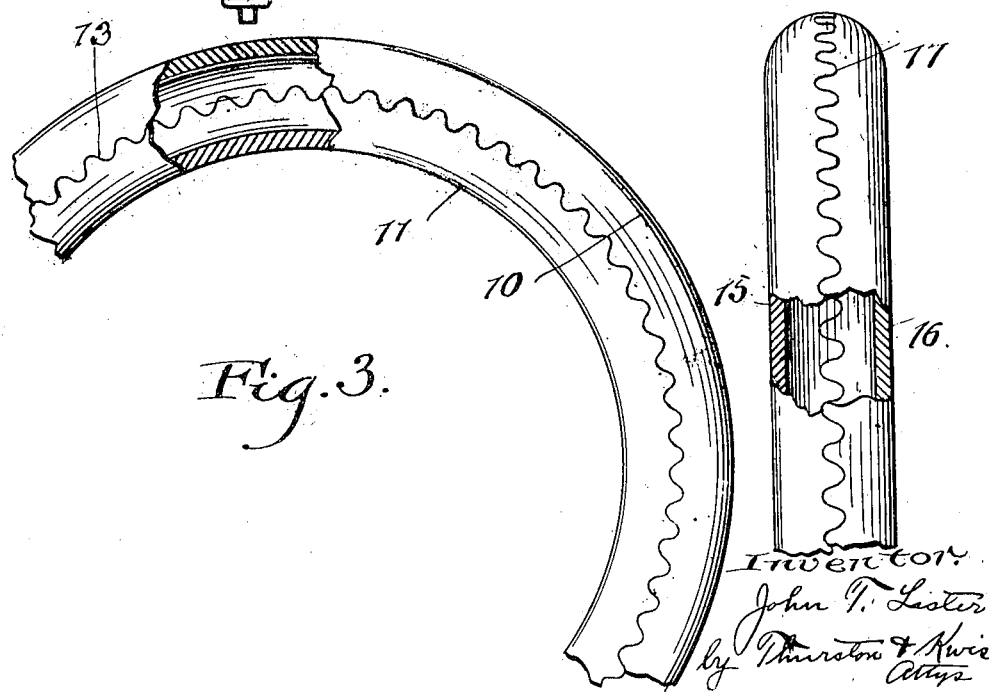

UNITED STATES PATENT OFFICE.

JOHN T. LISTER, OF NEAR WELLINGTON, OHIO.

INNER TUBULAR SUPPORT FOR PNEUMATIC TIRES.

1,291,948.　　　　Specification of Letters Patent.　　Patented Jan. 21, 1919.

Application filed July 26, 1918.　Serial No. 246,807.

*To all whom it may concern:*

Be it known that I, JOHN T. LISTER, a citizen of the United States, residing near Wellington, in the county of Lorain and State of Ohio, have invented a certain new and useful Improvement in Inner Tubular Supports for Pneumatic Tires, of which the following is a full, clear, and exact description.

This invention relates to an inner tubular support for pneumatic tires, such as are commonly employed on motor driven vehicles. It is the principal object of this invention to provide a strong and durable pneumatic tubular support which is designed to be inclosed in the ordinary casing or tire shoe, in the same manner that the thin rubber inner tube is now employed. More specifically considered, it is the aim of the invention to provide an inner endless tubular support designed to be filled with air, but which is less susceptible to puncturing and blow outs and has longer life than the ordinary inner tube.

In accordance with my invention, the inner tubular support of the tire is molded from unvulcanized rubber in two sections, each cup shaped in cross section, and circular in form, and of any desired thickness, the latter preferably exceeding the thickness of the thin inner tube now employed. To form the completed article, the two half sections are united along their circular edges by being placed one over the other, utilizing if necessary a cementing agency, such as rubber cement, and they are then vulcanized together so as to form a tubular support of considerable strength and resistance to puncturing which is of uniform thickness at all points, and inherently or naturally circular in form, so that when it is inserted in the outer casing and inflated through a suitable air valve all parts will be of substantially uniform thickness, and under substantially uniform tension.

Preferably the edges of the two molded halves are made irregular, such as of undulating form, so as to add to the strength of the tube when the parts are joined and vulcanized.

The invention may be further briefly summarized as consisting in certain novel details of construction and characteristics of the inner tubular tire support as will be described in the specification and set forth in the appended claims.

In the accompanying sheet of drawings, Figure 1 is a cross sectional view through a tubular support of a tire made in accordance with one form of the invention; Fig. 2 is a similar view showing a modification in the location of the joints where the two molded halves are united; Fig. 3 is a fragmentary side view on a reduced scale of the tire support shown in Fig. 1; and Fig. 4 is a fragmentary tread view of the tire support shown in Fig. 2, likewise on a reduced scale.

The inner tubular tire support of Figs. 1 and 3 is formed in two parts, preferably half sections 10 and 11 each substantially semicircular in cross section at any point, and endless or circular in shape circumferentially considered. These parts 10 and 11 are molded from plastic unvulcanized rubber and in the desired thickness to form after completion a wall having considerable inherent strength and resistance to puncturing and blow outs. When the sections 10 and 11 are formed they are placed together one on the other, with their similar edges matching and as before stated rubber cement or other suitable cementing agency may be utilized to assist in forming a tight, strong, air tight joint. Then they are vulcanized in a suitable vulcanizing mold, a certain degree of inflation being utilized during vulcanization if the same is found necessary to force the rubber out against the circular wall of the mold. A suitable valve stem 12 is provided in the section 11 for inflation during vulcanization, and after the tire is completed and ready for use in the tire casing.

In the form shown in Fig. 1, the joints where the two halves of the tubular support are united are shown at 13 and 14, these joints being on diametrically opposite sides of the tire support in a zone midway between the inner and outer peripheries of the article. Additionally, as will be observed, the edges of the molded half sections are made irregular, in this case of corrugated or undulating form, and when the two sections are placed together the undulations interfit or match. This construction is provided to strengthen the tire support along the joints of the two half sections.

The construction shown in Figs. 2 and 4 differs from that shown in Figs. 1 and 3 in the respect that the two half sections, here designated 15 and 16, have their joints indicated at 17 and 18 on diametrically opposite lines, but located one at the outer periphery and the other at the inner periphery of the tubular support. Otherwise the article of Figs. 2 and 4 is similar to that of Figs. 1 and 3, the edges of the section being of undulating shape, and both sections being originally molded of unvulcanized rubber into the circular trough shape and being united and subsequently vulcanized together in the manner first explained.

The tubular member above explained either formed as shown in Figs. 1 and 3 or as in Figs. 2 and 4, when inserted in the tire casing and inflated with the desired degree of pressure, affords the necessary or desired resiliency, but nevertheless it has longer life than an ordinary inner tube and is less easily punctured, and is not so susceptible to a blow out should the tire casing be weakened as when an ordinary thin inner tube is employed.

It will be understood, of course, that in molding the tubular support in two halves, which are subsequently united in the manner explained, the difficulties in removing a core about which each half is molded is not encountered, as is the case when it is attempted to mold an inner tube or tubular support as a complete unit or in the form of a complete circle transversely considered.

It will be understood also that by reason of the fact that each half section which will be formed of a size dependent upon the size of the tire, is molded in circular form, when the device is placed in the tire and inflated there are practically no unequal stresses and there is no unequal stretching to any material degree.

Having described my invention, I claim—

1. An inner tubular support for pneumatic tires composed of two annular endless sections molded from plastic unvulcanized rubber joined at their circumferential edges and vulcanized together.

2. A hollow rubber inner tubular support for pneumatic tire casings consisting of two sections each molded from plastic unvulcanized rubber into an endless piece substantially semi-circular in cross section and joined together at their edges and vulcanized.

3. A hollow rubber inner tubular support for pneumatic tire casings consisting of two sections molded into annular cup shaped form from unvulcanized rubber and joined together at their edges and vulcanized, the adjoining edges being of irregular form.

In testimony whereof, I hereunto affix my signature.

JOHN T. LISTER.